US011788258B2

(12) United States Patent
Currier

(10) Patent No.: US 11,788,258 B2
(45) Date of Patent: Oct. 17, 2023

(54) SYSTEMS AND METHODS FOR DETERMINING A LOCATIONAL VALUE OF A LOAD ASSOCIATED WITH AN IMPLEMENT

(71) Applicant: Caterpillar Inc., Peoria, IL (US)

(72) Inventor: Shaun D. Currier, Naperville, IL (US)

(73) Assignee: Caterpillar Inc., Peoria, IL (US)

( * ) Notice: Subject to any disclaimer, the term of this patent is extended or adjusted under 35 U.S.C. 154(b) by 630 days.

(21) Appl. No.: 16/825,249

(22) Filed: Mar. 20, 2020

(65) Prior Publication Data
US 2021/0293000 A1 Sep. 23, 2021

(51) Int. Cl.
  *E02F 9/26* (2006.01)
  *B60W 40/13* (2012.01)
  *E02F 9/24* (2006.01)
  *E02F 3/43* (2006.01)

(52) U.S. Cl.
  CPC ............. *E02F 9/265* (2013.01); *B60W 40/13* (2013.01); *E02F 9/24* (2013.01); *E02F 9/26* (2013.01); *B60W 2040/1315* (2013.01); *E02F 3/431* (2013.01)

(58) Field of Classification Search
  CPC ..... E02F 9/265; E02F 9/24; E02F 9/26; E02F 3/431; B60W 40/13; B60W 2040/1315
  See application file for complete search history.

(56) References Cited

U.S. PATENT DOCUMENTS

| 9,464,403 B2* | 10/2016 | Shatters | G01G 23/01 |
| 2002/0075157 A1* | 6/2002 | Muller | E02F 9/24 |
| | | | 340/679 |
| 2015/0176253 A1* | 6/2015 | Taylor | E02F 9/265 |
| | | | 701/33.9 |
| 2017/0131134 A1* | 5/2017 | Kang | G01G 19/083 |
| 2020/0131739 A1* | 4/2020 | Ueda | G01G 19/10 |
| 2022/0127817 A1* | 4/2022 | Sano | E02F 9/265 |

FOREIGN PATENT DOCUMENTS

| CN | 202543988 U | 11/2012 |
| CN | 103195128 A | 7/2013 |
| CN | 107273695 A | 10/2017 |
| JP | 2012220216 A | 11/2012 |
| JP | 2019066310 A | 4/2019 |

\* cited by examiner

*Primary Examiner* — James M McPherson
*Assistant Examiner* — Kyle J Kingsland
(74) *Attorney, Agent, or Firm* — Harrity & Harrity, LLP

(57) ABSTRACT

A method for determining implement load characteristics of a load carrying mobile machine includes receiving at least pressure data and position data associated with a payload received by the implement. The method also includes determining a locational value associated with the payload within the implement. The method further includes updating the locational value based on movement of the payload in the implement, the updated locational value being based at least on the pressure data, the position data, and predetermined physical parameters of the machine. The method further includes using the updated locational value to determine operational parameters of the machine.

20 Claims, 5 Drawing Sheets

SYSTEMS AND METHODS FOR DETERMINING A LOCATIONAL VALUE OF A LOAD ASSOCIATED WITH AN IMPLEMENT

TECHNICAL FIELD

The present disclosure relates generally to a mobile machine and, more particularly, to systems and methods for determining a locational value of a load associated with an implement of the mobile machine.

BACKGROUND

Industrial machinery, such as mobile heavy equipment, may utilize sensors (e.g., pressure sensors) installed on an arm, linkage, and/or an implement of the equipment to measure a carrying load of the implement and/or a payload of the implement. Such implements may include, for example, load carrying buckets of a wheel loader machine. The sensors may be associated with hydraulic cylinders of the linkage of the equipment to detect changes in pressures as the payload mass (or weight) within the implement changes. The payload mass can be determined as a function of pressure detected in the lift and tilt cylinders of the linkage. However, the payload measurement accuracy may be unreliable due to inconsistent signals output by the pressure sensors in the lift and tilt cylinders when the lift and tilt cylinders change position based on a change in position of the linkage and implement. That is, even if the amount of payload material in the implement remains the same, the pressure sensors in the lift and tilt cylinders may generate different signals when the linkages and implement change their positions or the distribution or location of material within the implement changes.

U.S. Pat. No. 9,464,403, issued to Shatters on Oct. 11, 2019 ("the '403 patent"), describes a method of estimating the weight of a payload in a bucket. The method described in the '403 patent involves estimating the payload weight by compensating for the force offset produced by a tilt movement of the bucket.

The disclosed methods and systems may solve one or more of the problems set forth above and/or other problems in the art. The scope of the current disclosure, however, is defined by the attached claims, and not by the ability to solve any specific problem.

SUMMARY

In one aspect, a method for determining implement load characteristics of a load carrying mobile machine may include receiving at least pressure data and position data associated with a payload received by the implement. The method may also include: determining a locational value associated with the payload within the implement; updating the locational value based on movement of the payload in the implement, the updated locational value being based at least on the pressure data, the position data, and predetermined physical parameters of the machine; and using the updated locational value to determine operational parameters of the machine.

In another aspect, a method for controlling a machine having an implement receiving variable payloads may include receiving at least pressure data and position data indicating an operation condition of the implement. The method may also include: determining a payload value of the implement as a function of the operation condition of the implement, the payload value including a variable center of gravity value as a function of the distribution of the variable payloads received by the implement; and controlling operational parameters of the machine based on the payload value.

In yet another aspect, a system for determining a load and a load center of gravity of an implement on a machine may include at least one position sensor coupled to the machine, at least one pressure sensor coupled to the machine, and a controller. The controller may be configured receive at least pressure data and position data associated with a payload received by the implement. The controller may be further configured to: determine a load value and a center of gravity value associated with the implement, the load value and the center of gravity value varying as a function of the payload and being based at least on the pressure data, the position data, and predetermined physical parameters of the machine; and determine a payload value based on the load value and the center of gravity value.

DETAILED DESCRIPTION

Both the foregoing general description and the following detailed description are exemplary and explanatory only and are not restrictive of the features, as claimed. As used herein, the terms "comprises," "comprising," "having," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," and "approximately" are used to indicate a possible variation of ±10% in the stated value. Although the current disclosure is described with reference to a wheel loader and bucket implement, this is only exemplary. In general, the current disclosure can be applied to any type load carrying implement and any type of heavy equipment/machine, such as, for example, any type of truck, loader, load-haul dump machine, carry dozer, etc. While the current disclosure references exemplary placements of sensors, such sensors may be placed in other suitable locations consistent with the present disclosure.

Figure 1:
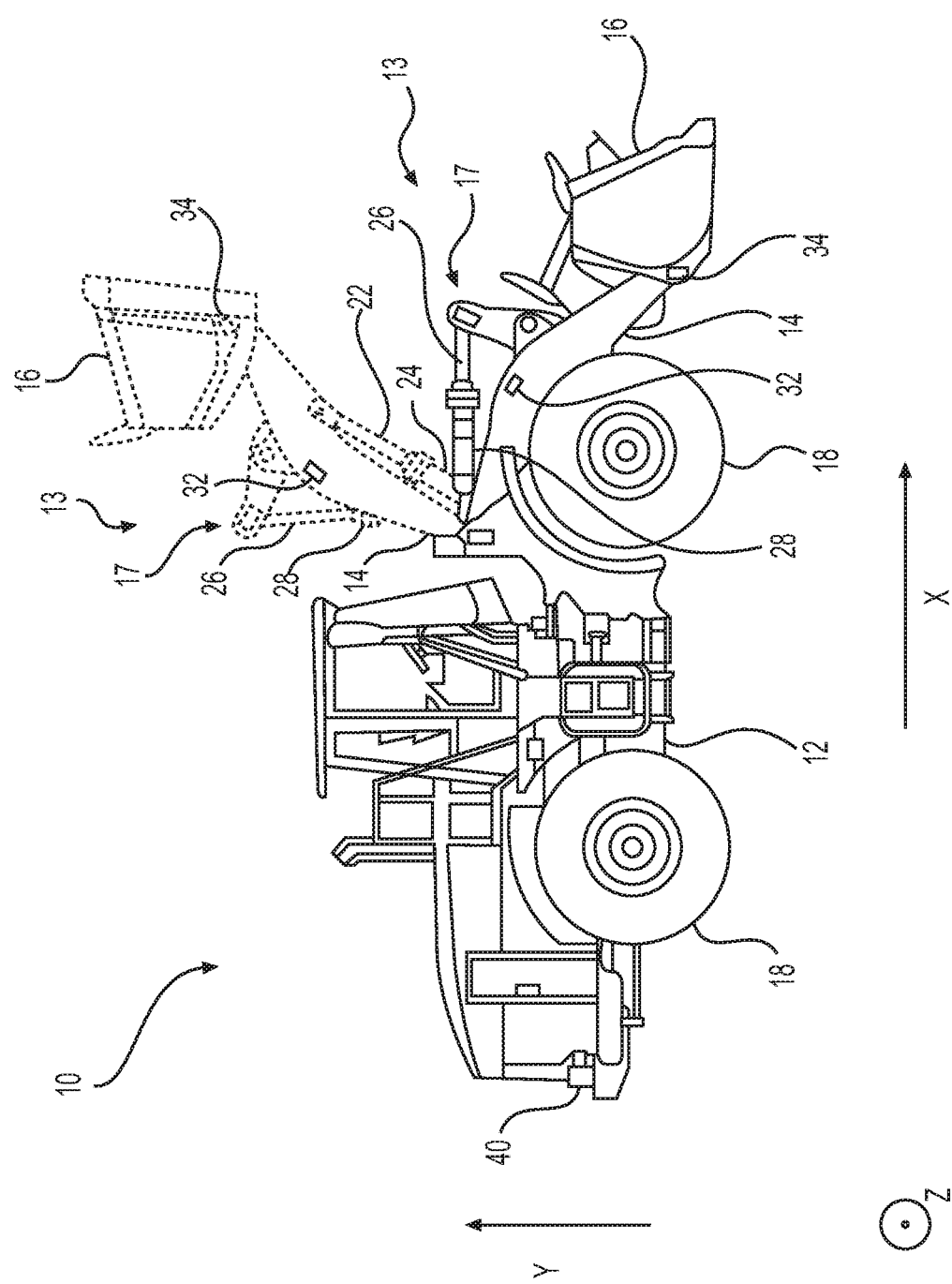
FIG. 1 is a side view of an exemplary machine in a first configuration and in a second configuration.

FIG. 1 depicts an exemplary wheel loader 10. Although the machine depicted in FIG. 1 is a wheel loader, wheel loader 10 may be any of the types of machines described above. A positive x-direction, as shown in FIG. 1, may be in a direction toward a front of wheel loader 10, relative to an operator in a cab of wheel loader 10. A positive y-direction may be in a direction toward a top of wheel loader 10. A positive z-direction may be in a direction toward a right of wheel loader 10, relative to an operator in a cab of wheel loader 10 (out of the page, as shown in FIG. 1). Wheel loader 10 may include a machine body 12, which may include components such as an operator station, an engine housing, and an engine. Wheel loader 10 may also include an implement assembly 13. Implement assembly 13 may include an arm 14, a linkage 17, and a bucket 16. Bucket 16 may be coupled to an end of arm 14. Bucket 16 may also be a different work implement, such as a fork, grapple, etc.; a bucket is merely exemplary. Linkage 17 may have two degrees of freedom. Wheel loader 10 may include ground surface engaging devices, such as wheels 18 that support wheel loader 10. Although a wheeled machine is shown and described, one skilled in the art will appreciate that other machines, including track-type machines, may also be utilized. FIG. 1 shows wheel loader 10 with a first, lowered configuration (solid lines) of implement assembly 13 and with a second, raised configuration (dashed lines) of implement assembly 17.

In the example of wheel loader 10 being a wheel loader, lift of bucket 16 and/or arm 14 may be powered and controlled by a lift actuator 22. Lift actuator 22 may include, for example, a hydraulic fluid cylinder actuator or any other type of actuator, as would be apparent to one skilled in the art. One or more lift pressure sensors 24 may be configured to measure forces within the actuator 22, or on another component of lift actuator 22, and may be force sensors. Tilt of bucket 16 may be powered and controlled by a tilt actuator 26. Tilt actuator 26 may include, for example, a hydraulic fluid cylinder actuator or any other type of actuator, as would be apparent to one skilled in the art. One or more tilt pressure sensors 28 may be configured to measure forces within the actuator 26, or on another component of tilt actuator 26, and may be force sensors. For example, lift pressure sensors 24 and tilt pressure sensors 28 may be disposed in/on a head end and a rod end of lift actuator 22 and tilt actuator 26, respectively. Alternatively, lift pressure sensors 24 and tilt pressure sensors 28 may be disposed in other locations relative to an actuator, such as within a hydraulic circuit associated with an actuator. Force or pressure information may also be derived from other sources, including other sensors.

Forces acting on lift and/or tilt cylinder 22, 26 may include a head-end pressure and/or a rod-end pressure on each side of a piston of the actuator. As noted, lift pressure sensors 24 and tilt pressure sensors 28 may be configured to measure one or both of head-end and rod-end pressures of the lift and tilt cylinders, respectively. Alternatively, lift pressure sensors 24 and tilt pressure sensors 28 may be configured to measure a net force acting on a lift or tilt cylinder, respectively. Lift pressure sensors 24 and tilt pressure sensors 28 may detect pressure of fluid within their respective actuator.

Arm 14 may include an arm position sensor 32. Arm position sensor 32 may gather data indicative of a position of arm 14, including for example, an angle, a height or an extension of arm 14. Bucket 16 may include a bucket position sensor 34. Bucket position sensor 34 may gather data indicative of a position of bucket 16, including, for example, a height, lateral location, and/or tilt of bucket 16. Bucket position sensor 34 may be sensed directly or indirectly. For example, bucket position sensor 34 may include one or more sensors (such as rotational sensors) positioned on a portion of implement assembly 13 and may measure a position of bucket 16 indirectly. For example, bucket position sensor 34 may provide information about an extension length of a linkage actuator, an angle between members of linkage 17, and/or a tip of bucket 16 with respect to a ground surface or another reference datum. Wheel loader 10 may include an articulation sensor (not shown) to detect an articulation angle or steering angle between a front frame and a rear frame of wheel loader 10. Arm position sensor 32 and/or bucket position sensor 34 may provide information pertaining to a linear displacement of a cylinder of lift actuator 24 or tilt actuator 26 and/or an angular displacement of arm 14. Arm position sensor 32, bucket position sensor 34, and articulation sensor may include rotary-style sensors, magnetic pick-up type sensors, magnetostrictive-type sensors associated with a wave guide, cable-type sensors associated with cables, internally- or externally-mounted optical sensors, LIDAR, RADAR, SONAR, camera-type sensors, or any other type of height-detection/position-detection sensors known in the art. Arm position sensor 32, bucket position sensor 34, and articulation sensor may all be connected to a controller 102 (FIG. 3) on the wheel loader 10, and the sensors may also include information from other sources.

An inertial measurement unit ("IMU") 40 may also be coupled to wheel loader 10. As shown in FIG. 1, IMU 40 may be coupled to a rear portion of wheel loader 10, opposite from linkage 17. IMU 40 may transmit an acceleration and/or angular rate signal. Alternatively, IMU 40 may be mounted in any other suitable position on wheel loader 10. IMU 40 may be positioned on any suitable surface of wheel loader 10. For example, IMU 40 may be located on a bottom surface of wheel loader 10, on a front or rear surface of wheel loader 10, or on a top surface of wheel loader 10. IMU 40 may be enclosed in a housing of wheel loader 10 or may be on an exterior surface of wheel loader 10.

IMU 40 may be mounted or otherwise coupled to wheel loader 10 so that a plane fixed in the coordinate system of IMU 40 is substantially parallel to an X-Y plane of wheel loader 10. IMU 40 may have a mounting location on wheel loader 10 such that measurements may be transformed to an equivalent representation in the coordinate system of linkage 17. For example, such a transformation may be achieved by a rotation matrix representing the angle between the rear frame of wheel loader 10 and linkage 17. IMU 40 may be coupled to wheel loader 10 using any suitable mechanism, such as bolts or other coupling mechanisms. IMU 40 and/or wheel loader 10 may be configured to facilitate placement of IMU 40 on wheel loader 10.

IMU 40 may be any suitable type of conventional inertial sensor and may be or may include an acceleration sensor, angular rate sensor, slope, and/or magnetic field sensor. For example, IMU 40 may be an electronic device that measures and reports information about wheel loader 10, including, for example, acceleration (such as a proper acceleration), angular rate, slope, and/or magnetic field. IMU 40 may include, for example, one or more accelerometers, one or more gyroscopes, and/or one or more magnetometers. IMU 40 may be configured to measure a specific acceleration of wheel loader 10. For example, IMU 40 may be configured to provide a gravity vector, proper acceleration vector, angular rate vector, slope vector, and/or magnetic field vector.

Figure 2B:
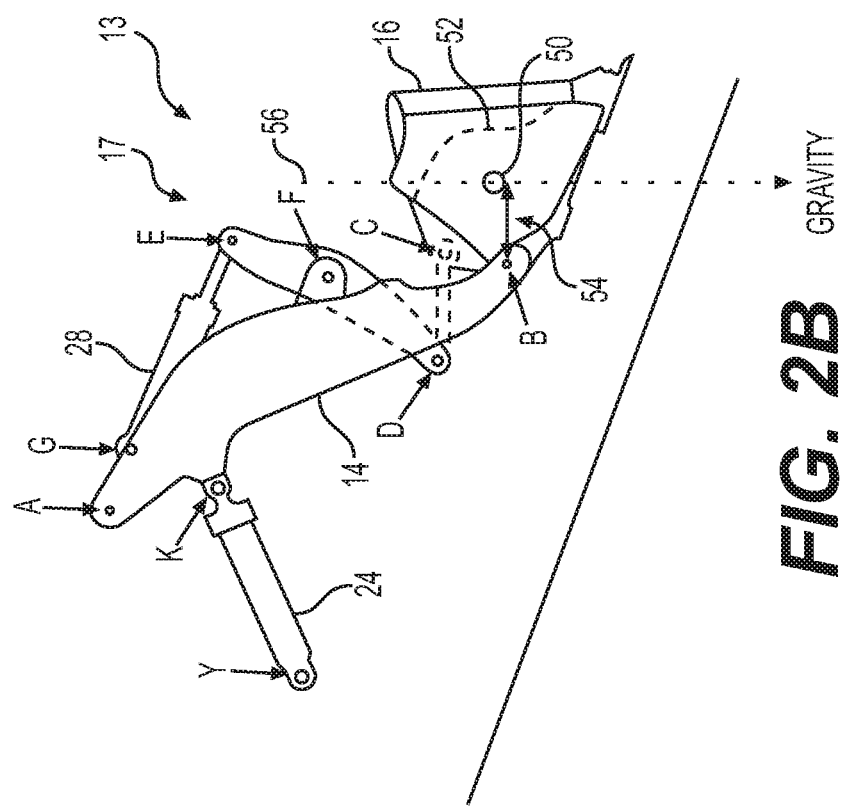
FIG. 2B illustrates yet another side view of the implement system of the exemplary machine.
Figure 2A:
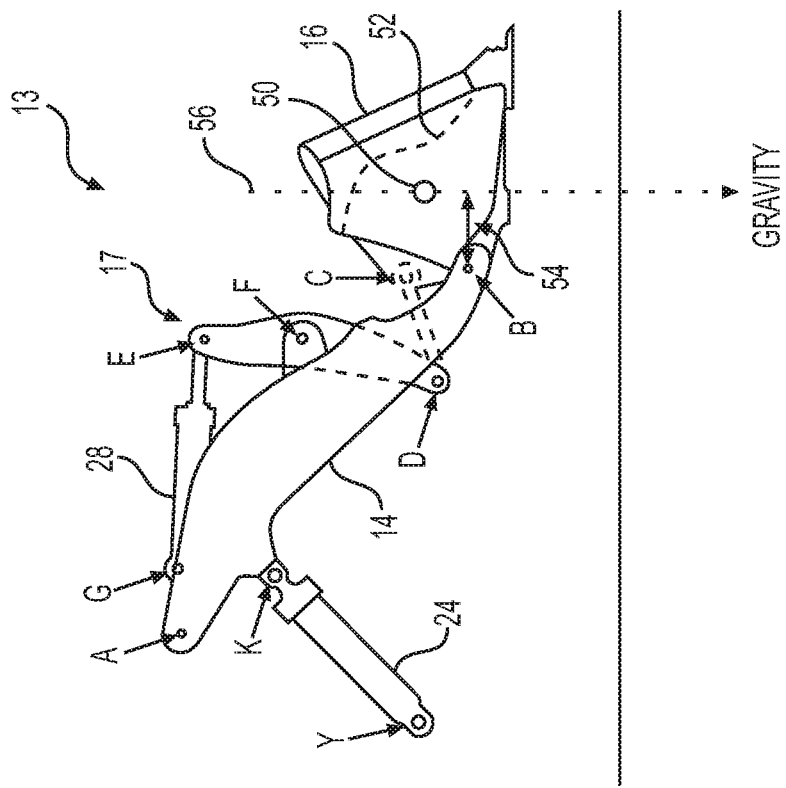
FIG. 2A illustrates a side view of an implement assembly of the exemplary machine.

FIG. 2A shows a side view of implement assembly 13 of wheel loader 10. Implement assembly 13 may include a plurality of pins for facilitating movement and coupling bucket 16, arm 14, and linkage 17 together. Implement assembly 13 may include pins A-G, K, and Y to facilitate movement of arm 14, bucket 16, and linkage 17 based on commands received by an operator of wheel loader 10. For example, bucket 16 may be rotatably connected to pin B to pivot about an axis defined by pin B when the operator provides a command to tilt bucket 16 rotationally forward or backward. Further, linkage 17 may be rotatably connected to pin A to pivot about an axis defined by pin A when the operator provides a command to lift or lower arm 14 and bucket 16 with respect to a ground surface.

FIG. 2A also illustrates a center of gravity location 50. Center of gravity location 50 may be a center of gravity location of the load of bucket 16 (if empty) or a lumped/combined load of bucket 16 and payload 52. Payload 52 may be dirt, rock, or any other material that may be received by bucket 16 or any of the types of implement described above. Center of gravity location 50 may be determined, for example, by determining a center of gravity distance 54 based on a function of forces detected by lift pressure sensors 24 and tilt pressure sensors 28, as well as positions of implement assembly 13 detected by arm position sensor 32 and bucket position sensor 34. Additionally, physical parameters of implement assembly 13 (e.g., physical dimensions of arm 16, linkage 17 and/or bucket 16), IMU data, and/or predetermined wheel loader position data (e.g., assuming that wheel loader 10 is on level ground) may be utilized in the function for determining center of gravity distance 54. Accordingly, center of gravity location 50, which may be determined based on center of gravity distance 54, may be a function of lift pressure data, tilt pressure data, arm position data, IMU data, predetermined wheel loader position data, and/or physical parameters of implement assembly 13.

In one aspect, the tilt movement of bucket 16, the movement of arm 14, and/or the amount and/or position of payload 52 within bucket 16 may be utilized for determining center of gravity location 50. Additionally, center of gravity location 50 may be determined by measuring center of gravity distance 54 from a predetermined position on implement assembly 13 or any other position on wheel loader 10 to a gravity vector 56 that runs through center of gravity location 50. For example, center of gravity distance 54 may be measured from pin B along a line perpendicular to gravity vector 56 (that runs vertically at center of gravity location 50). Center of gravity distance 54 may vary based on the position of bucket 16 and/or payload 52. Center of gravity distance 54 may be determined based on the function of various data described above. In one example, if payload 52 within bucket 16 is distributed or piled substantially closer to pin B than a predetermine position, for example, the tip of bucket 16, center of gravity distance 54 may be shorter compared to payload 52 being distributed or piled substantially in the center region of bucket 16. Conversely, if payload 52 is distributed or piled substantially closer to the tip of bucket 16 rather than pin B, center of gravity distance 54 may be greater compared to payload 52 being distributed or piled in the center region of bucket 16. Of course, center of gravity distance 54 may vary, in combination with various payload positions within bucket 16 and based on other factors such as a tilt angle of bucket 16, location of arm 16, etc.

In one aspect, center of gravity location 50 may vary based on movement and/or position of implement assembly 13 and wheel loader 10. For example, if arm 14 is lifted vertically (e.g., in fully raised position as shown in dashed lines in FIG. 1), center of gravity location 50 may become closer to pin B compared to center of gravity location 50 when bucket 16 is in a vertically lowered position closer to ground (such as in solid lines in FIG. 1). As such, center of gravity distance 54 may be shorter in this aspect. In another aspect, center of gravity location 50 may vary based on movement and/or position of the mass of bucket 16 or a lumped mass of bucket 16. For example, if payload 52 in bucket 16 shifts and changes its position, center of gravity location 50 may change based on the change in pressure being detected by lift pressure sensors 24 and/or till pressure sensors 28. That is, despite there being no change in the position of bucket 16 and/or arm 14 with respect to wheel loader 10, center of gravity location 50 may become closer or farther from pin B based on the amount and/or position of payload 52 within bucket 16. Additionally or alternatively, load center of gravity location 50 may vary if bucket 16 is tilted up or down. Load center of gravity location 50 may vary based on the movement of arm 14 singly or in combination with the movement of bucket 16. As such, center of gravity location 50, which may be determined based on center of gravity distance 54, with respect to the mass or lumped mass of bucket 16 may be determined based on a function of combination of forces being detected by lift pressure sensors 24 and tilt pressure sensors 28 and positions detected by arm position sensor 32 and bucket position sensor 34, as well as physical parameters of implement assembly 13.

Additionally or alternatively, a load of bucket 16, a lumped load of bucket 16, and/or a payload 52 of bucket 16 may be calculated based on a function of lift pressure data, tilt pressure data, arm position data, and physical parameters of implement assembly 13. In one aspect, a calibration process may be performed to determine a load (e.g., weight) of an empty bucket 16 (or any other types of implement) based on the function described above by measuring pressures being exerted on lift pressure sensors 24 and tilt pressure sensors 28 at a predetermined position (e.g., at fully racked position or any other suitable position) while wheel loader 10 is on a flat ground. Additionally, during the calibration process, center of gravity values (e.g., center of gravity distance and/or location) of the empty bucket 16 may be determined. That is, the load of an empty bucket 16 (calibration load) and the center of gravity values of the empty bucket 16 (calibration center of gravity values) may be determined together at the same time during the calibration. Accordingly, payload and payload center of gravity values may be accurately determined based on a function of calibration load, measured lumped/combined load, calibration center of gravity values, and lumped center of gravity values. In one aspect, the payload, load of bucket 16 and/or lumped load of bucket 16 may be determined dynamically/continuously at any position of bucket 16. For example, payload 52 may be determined by subtracting the calibration load of bucket 16 from the combined/lumped load of bucket 16 and payload 52. The equation for calculating payload 52 may be represented as follows:

Payload=Lumped Load−Calibration Load

Additionally, the payload center of gravity values may be determined by subtracting the calibration center of gravity value weighted by the calibration load from the lumped center of gravity value weighted by the lumped load. The equation for calculating the payload center of gravity values may be represented as follows:

Payload Center of Gravity Value=(Lumped Center of Gravity Value*Lumped Load−Calibration Center of Gravity Value*Calibration Load)/Payload In another aspect, as shown in FIG. 2B, center of gravity distance 54 may vary based on an orientation of wheel loader 10 (e.g., wheel loader 10 on a sloped ground surface) with respect to ground, even though center of gravity location 50 has not changed relative to linkage 17. In this aspect, center of gravity distance 54 may be larger compared to center of gravity distance 54 as shown in FIG. 2A. This difference presents itself in pressures being exerted on lift pressure sensors 24 and tilt pressure sensors 28 and if uncompensated may lead to erroneous load and center of gravity determinations. Such discrepancy may be compensated by using IMU 40. IMU 40 may determine the orientation of wheel loader 10 on the sloped surface. That is, IMU 40 may measure and report information about of wheel loader 10 (e.g., slope, acceleration, etc.) using various sensors (e.g., angular rate sensor, a slope sensor, etc.). As such, the mass of payload within bucket 16, the total/lumped mass of bucket 16 (e.g., including payload), and the total/lumped center of gravity of bucket 16 may be determined dynamically/continuously based on the above-described function by additionally utilizing the IMU data.

Figure 3:
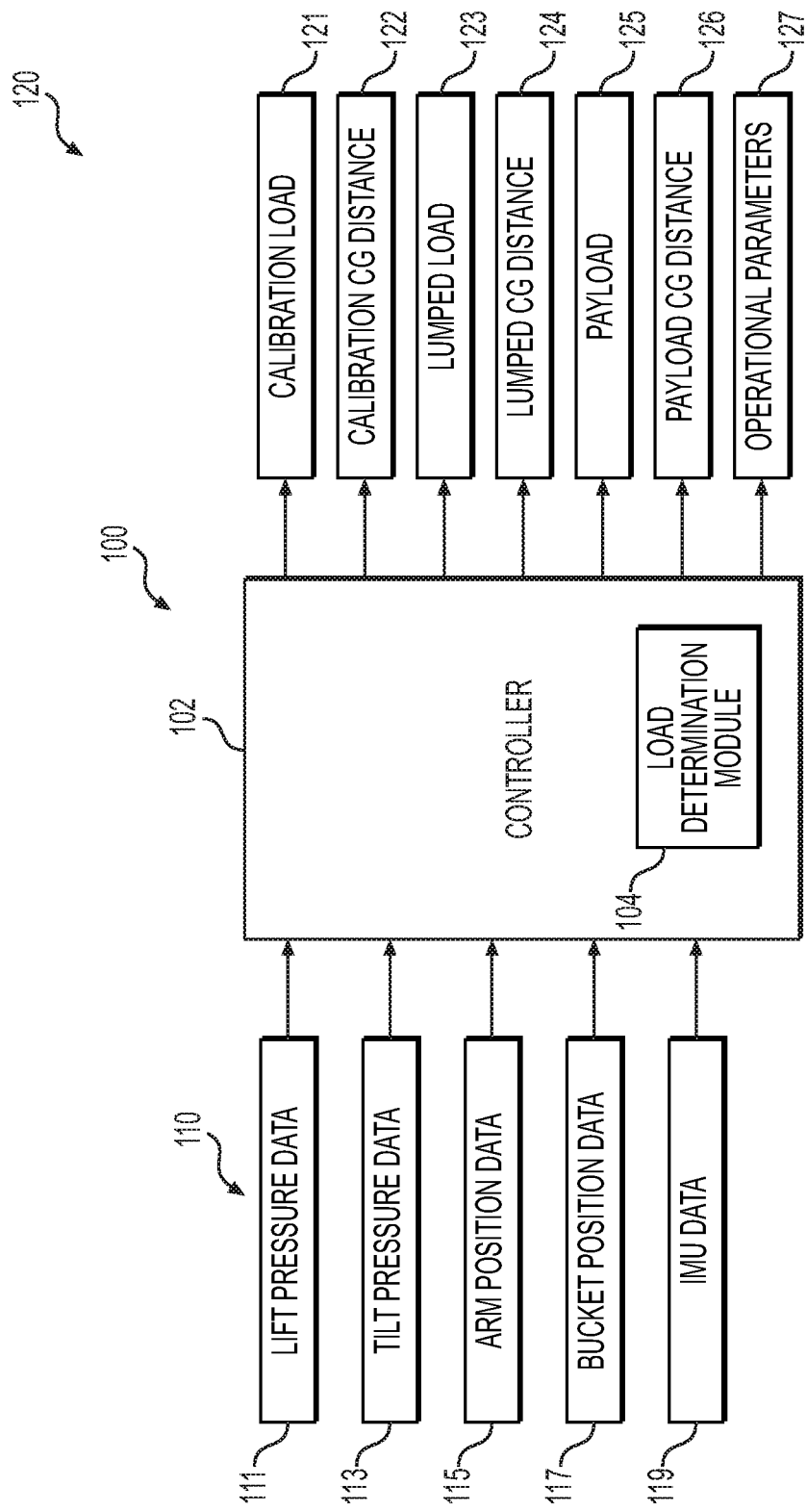
FIG. 3 is a block diagram of an exemplary control system of the exemplary machine of FIG. 1.

FIG. 3 illustrates an exemplary load determination system 100 that may be utilized by wheel loader 10. System 100 may include one or more inputs 110, a controller 102, and one or more outputs 120. Lift pressure sensor 24 may provide lift pressure data 111 such as lift head-end pressure and lift rod-end pressure. Lift pressure sensor 24 is depicted with one reference for convenience in the figures herein but may actually include two sensors—one attached to a head-end and one attached to a rod-end. Tilt pressure sensor 28 may provide tilt pressure data 113 such as tilt head-end pressure and tilt rod-end pressure. Tilt pressure sensor 28 is depicted with one reference for convenience in the figures herein but may actually include two sensors—one attached to a head-end and one attached to a rod-end. Arm position sensor 32 and/or bucket position sensor 34 may provide arm position data 115, implement position data 117 (e.g., bucket position data) such as a linear displacement of a cylinder of tilt actuator 26 and/or an angular displacement of arm 14. IMU 40 may provide IMU data 119 such as a raw output vector. The raw output vector may be a raw gravity and/or proper acceleration vector relative to the local coordinate system of IMU 40, as described above. A vector provided by IMU 40 may include x-, y-, and z-directional components.

Controller 102 may be configured to provide output 120. Output 120 may include, for example, a calibration load data 121, a calibration center of gravity distance data 122, a lumped load data 123, a lumped center of gravity distance data 124, a payload data 125, a payload center of gravity distance data 126, and operational parameters 127 of wheel loader 10. Further, controller 102 may include a load determination module 104. Load determination module 104 may receive inputs 110, implement a method for determining calibration load data 121, calibration center of gravity distance data 122, lumped load data 123, lumped center of gravity distance data 124, payload data 125, payload center of gravity distance data 126, and operational parameters 127 of wheel loader 10, as described with reference to FIG. 4 below. In one aspect, load determination module 104 may determine calibration load data 121 and calibration center of gravity distance data 122 as described in the calibration process above. Further, load determination module 104 may determine lumped load data 123 and lumped center of gravity distance data 124 based on the function of measured lift pressure data, tilt pressure data, and arm position data, and physical parameters of implement assembly 13. In one aspect, determination module 104 may determine lumped center of gravity distance data 124 by calculating a perpendicular distance from a predetermined position on wheel loader 10 to load center of gravity vector 56 based on the function of measured lift pressure data, tilt pressure data, and arm position data, and physical parameters of implement assembly 13. In another aspect, load determination module 104 may determine payload data 125 and payload center of gravity distance data 126 by subtracting a calibration load from a lumped load and by subtracting a weighted calibration center of gravity distance from a weighted lumped center of gravity distance. In one aspect, controller 102 may provide signals indicating the mass of payload 52 (e.g., payload data 125) to be displayed on a display viewable by the operator of wheel loader 10 based on output 120.

Still referring to FIG. 3, operational parameters 127 of wheel loader 10 may include, for example, parameters for controlling acceleration and/or deceleration of wheel loader 10, tilt capacity of bucket 16, high dump bucket roll-out, and/or Tip-Off Assist feature. In one aspect, operational parameters 127 in combination with other signals of output 120, singly or in combination, may provide stability features for the above noted parameters. In one aspect, operational parameters 127 may be determined based at least on a change in payload center of gravity distance 126 due to a change in the position/distribution of payload within bucket 16. That is, various stability parameters may be adjusted based on the change in the payload center of gravity distance 126. The stability of acceleration and/or deceleration of wheel loader 10 may be provided by limiting the acceleration and/or deceleration or by providing a visual and/or audible warning, when the parameters for acceleration and/or deceleration is greater than a predetermined threshold. Further, the stability of tilt capacity of bucket 16 may be provided by limiting the tilt capacity of bucket 16 or by providing a visual and/or audible warning, for example, when linkage 17 is moved to a certain position with payload 125 being greater than a predetermined threshold. Furthermore, the stability of the high dump bucket roll-out feature of wheel loader 10 may be provided by limiting the tilt movement of bucket 16 or by providing a visual and/or audible warning. A high dump bucket is a feature that adds a third degree of freedom to linkage 17 by rotating about a digging edge to allow for dumping higher than what is possible when rotating about B-pin. Accordingly, if the load in bucket 16 is greater than a predetermined threshold during a high dump bucket operation, an increase in distance to the load can cause instability, acceleration, deceleration, and/or tilt capacity issues. Additionally, the parameter for the Tip-Off Assist feature may be controlled to automatically control bucket 16 to dump varying amounts of payload until the payload remaining in bucket 16 satisfies a target payload. As such, Tip-Off Assist feature may allow, for example, unskilled operators to achieve a target payload more easily and accurately.

Controller 102 may embody a single microprocessor or multiple microprocessors that may include hardware and software for monitoring operations of wheel loader 10 and issuing instructions to components of wheel loader 10. For example, controller 102 may include a memory, a secondary storage device, a clock, and a processor, such as a central processing unit or any other means for accomplishing a task consistent with the present disclosure. The memory or secondary storage device associated with controller 102 may store data and/or software routines that may assist controller 102 in performing its functions. Further, the memory or storage device associated with controller 102 may also store data received from the various inputs 110 associated with wheel loader 10. Numerous commercially available microprocessors can be configured to perform the functions of controller 102. It should be appreciated that controller 102 could readily embody a general machine controller capable of controlling numerous other machine functions. Various other known circuits may be associated with controller 102, including signal-conditioning circuitry, communication circuitry, hydraulic or other actuation circuitry, and other appropriate circuitry. Controller 102 may be programmed with a variety of properties of wheel loader 10, including, e.g., masses and dimensions of components of implement assembly 13.

INDUSTRIAL APPLICABILITY

Figure 4:
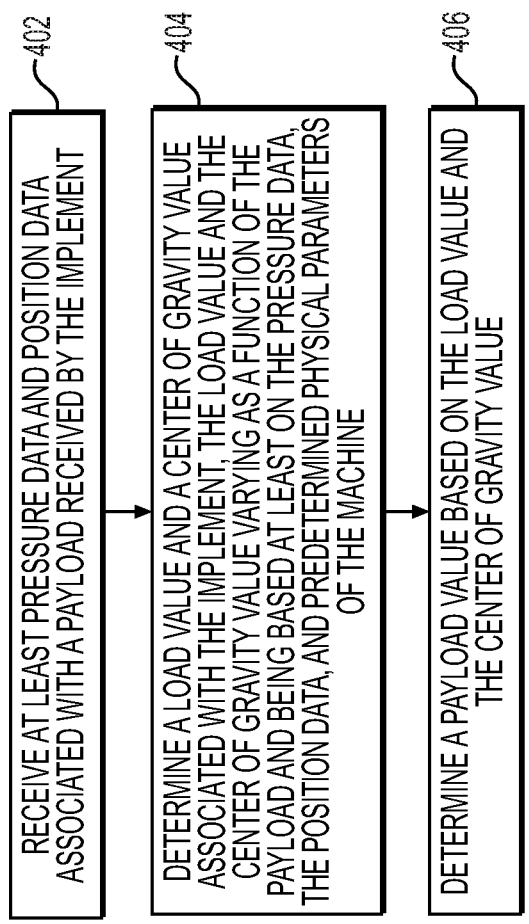
FIG. 4 is a flowchart of a method for detection of load and load center of gravity according to an aspect of the present disclosure.
Figure 5:
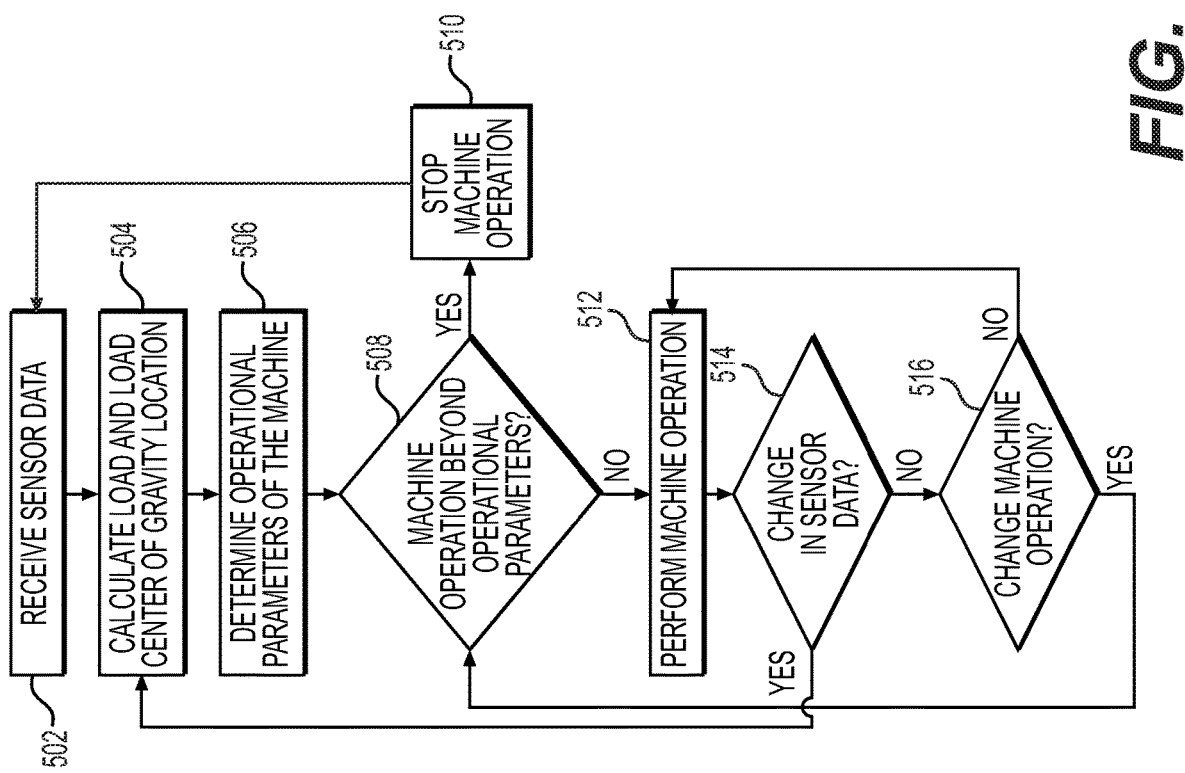
FIG. 5 is a flowchart of an exemplary method of controlling the exemplary machine of FIG. 1 using the exemplary control system of FIG. 3.

The disclosed aspects of system 100 and methods described in FIGS. 4 and 5 may be used during operation of any load carrying machine used in a variety of settings. For example, load determination module 104 may determine load and load center of gravity location 50 based on center of gravity distance 54 to accurately determine the amount and location of the payload of an implement (e.g., bucket 16). With this information, operational parameters of a load carrying machine can be controlled for a variety of purposes including, for example, helping ensure stability safety features for operators, safe operating region for autonomy, and general payload measurement in any position of linkage 17. System 100 and methods described in FIGS. 4 and 5 may help ensure precise determination of permissible operating parameters within in which wheel loader 10 can operate by knowing the amount of the payload and how the payload is distributed in the bucket 16. In one example, system 100 may warn the operator of wheel loader 10 when a value of load/payload and load center of gravity location 50 reaches a predetermined threshold value corresponding to, for example, a safety machine load or tipping limit.

FIG. 4 is a flow chart depicting an exemplary process for determining the payload of wheel loader 10. During any part of the process, bucket 16 may be loaded with payload 52 (e.g., dirt) or may be empty. Payload 52 placed in bucket 16 is not required to be a known mass. Payload 52 placed in bucket 16 may be a load having a known or an unknown mass. As described below, determining the mass of payload 52 involves continuously monitoring inputs 102 as arm 14, bucket 16, and linkage 17 positions change. Discrepancies in payload measurements due to, for example, a sloped surface effecting center of gravity vector 56 of wheel loader 10, may be compensated by, for example, by utilizing the center of gravity vector detected by IMU 40.

In step 402, load determination module 104 may receive at least pressure data and position data associated with payload 52 received by implement (e.g., bucket 16). The pressure data may be received from lift pressure sensor 24 and tilt pressure sensor 28, and the position data may be received from arm position sensor 32 and implement position sensor 34. Additionally, determination module 104 may receive IMU data from IMU 40.

In step 404, load determination module 104 may determine a load value and a center of gravity value associated with implement or bucket 16. In one example, the load value may be determined based on a mass of the implement (e.g., bucket 16) and a mass of payload 52. The load value and the center of gravity value may vary as a function of load of bucket 16 and/or payload 52 based at least on the pressure data, the position data, and predetermined physical parameters of wheel loader 10. For example, if the pressure data indicates an increase in force detected by lift and tilt pressure sensors 24, 28, load determination module 104 may determine that the load of implement (e.g., bucket 16) has increased. The indication of increase in the amount of force detected by pressure sensors 24, 28 based on the change in position of implement assembly 13. For example, if the implement or bucket 16 is tilted in a predetermine direction, the pressure being sensed by pressure sensors 24, 28 may be changed even if the amount of payload 52 in the implement remains unchanged. The physical parameters of wheel loader 10 may be physical parameters of implement assembly 13 that may be provided based, for example, at least on the specification and/or physical measurements of implement assembly 13 of wheel loader 10. In one aspect, the center of gravity value may be variable and may be based on load center of gravity location 50. Further, center of gravity location 50 may be based on a perpendicular distance from a predetermined location (e.g., pin B in FIG. 2) on the machine to gravity vector 56 at center of gravity location 50.

Additionally or alternatively, determination module 104 may determine a payload value of the implement (e.g., bucket 16) as a function of the operation condition of the implement. The operation condition of the implement may include a position of implement or a load value (or weight) of implement (e.g., mass of bucket 16 alone or combined/lumped mass of bucket 16 and payload 52 in implement 17). The payload value may include a variable center of gravity value as a function of the distribution or pile position of variable payloads received by the implement. The load value of bucket 16 may be determined based on a mass of bucket 16 and a mass of the variable payloads. Determination module 104 may further determine a load calibration value of the implement and adjust the load value based on the load calibration value. Additionally, determination module 104 may determine an instant payload value of the implement by subtracting a load calibration value from a measured lumped load value.

In step 406, controller 102 may control machine operational parameters based at least on the load value, the payload value, and the center of gravity value. The operational parameters of wheel loader 10 may be, for example, maximum payload value, machine speeds, maximum lift height, maximum tilt angle, etc. The operational parameters may be controlled further based on inertial measurement values from IMU 40. Determination module 104 may receive inertial data from an inertial measuring unit (e.g., IMU 40) and determine the load value and the center of gravity value associated with the implement or bucket 16 based on the received inertial data.

FIG. 5 shows a flowchart of an exemplary method of controlling operational parameters of wheel loader 10 based on the load value and the center of gravity value. In step 502, Determination module 104 may receive sensor data from, for example, lift pressure sensor 24, tilt pressure sensor 28, linkage position sensor 34, implement position sensor 34, and/or IMU 40. At step 504, determination module 104 may calculate load/payload, and/or load center of gravity location 50. At step 506, determination module 104 may determine operational parameters of wheel loader 10. In one aspect, a payload center of gravity distance may be updated based on movement of the payload in the implement. The updated payload center of gravity distance may be based at least on the pressure data, the position data, and predetermined physical parameters of the machine. Accordingly, the updated payload center of gravity distance may be used to determine the operational parameters of wheel loader 10. The operational parameters may include steering angle, speed, acceleration/deceleration, linkage movement, and/or drivable ground slope. In an aspect, the operational parameters may include parameters for controlling acceleration and/or deceleration of wheel loader 10, tilt capacity of bucket 16, high dump bucket roll-out, and/or Tip-Off Assist feature. At step 508, determination module 104 may determine whether wheel loader 10 is operating beyond permissible predetermined operational parameters. If yes, determination module 104 may output commands to stop wheel loader 10 at step 510 and repeat the control method from step 502. Otherwise, at step 512, machine will continue to perform operation as commanded by the operator of wheel loader 10. The predetermined operational parameters may correspond to predetermined parameter threshold values for proving, for example, predetermined stability safety features for operators, safe operating region for autonomy, and general payload measurement. In one example, at step 512, controller 102 may warn the operator of wheel loader 10 if machine is operating beyond a predetermined threshold value.

At step 514, determination module 104 may determine whether a change in sensor data has been detected. For example, if determination module 104 receives signals from lift pressure sensor 24, tilt pressure sensor 28, linkage position sensor 34, implement position sensor 34, and/or IMU 40 that are above respective thresholds, determination module 104 may repeat the control method from step 504. Otherwise, determination module 104 may determine whether machine operation has changed based on the operator command. If yes, determination module 104 may repeat the control method from step 504 to recalculate load/payload and load center of gravity location 50. Otherwise, module 104 may repeat the control method from step 512 to continue machine operation as commanded.

It will be apparent to those skilled in the art that various modifications and variations can be made to the disclosed system without departing from the scope of the disclosure. Other embodiments of the system will be apparent to those skilled in the art from consideration of the specification and practice of the machine disclosed herein. It is intended that the specification and examples be considered as exemplary only, with a true scope of the disclosure being indicated by the following claims and their equivalents.

What is claimed is:

1. A system for a machine, the system comprising:
a controller configured to:
  determine a load value associated with an implement of the machine;
  determine a center of gravity distance based on a distribution of a payload, within the implement, relative to a pin that is connected to the implement;
  determine a center of gravity location, associated with the implement, based on the center of gravity distance;
  determine a payload value based on the load value and the center of gravity location; and
  control one or more operational parameters of the machine based on the payload value.

2. The system of claim 1,
wherein the controller is further configured to:
  receive pressure data from a lift pressure sensor and a tilt pressure sensor; and
  receive position data from a linkage position sensor and an implement position sensor, and
  wherein, to determine the load value, the controller is configured to:
    determine the load value based on the pressure data and the position data.

3. The system of claim 1, wherein the one or more operational parameters are controlled further based at least on the load value.

4. The system of claim 1, wherein the one or more operational parameters are controlled further based on an inertial measurement value.

5. The system claim 1, wherein the implement is a bucket.

6. The system of claim 1, further comprising:
a linkage position sensor coupled to the machine,
  wherein the controller is further configured to:
    receive position data from the linkage position sensor, and
  wherein one or more of the center of gravity distance or the center of gravity location is determined using the position data.

7. The system of claim 1, wherein at least one of the load value or the center of gravity distance is determined using information regarding linkage of the machine.

8. The system of claim 1, wherein, to determine the center of gravity distance, the controller is configured to:
  determine the center of gravity distance based on whether the distribution of the payload, within the implement, is closer to the pin than a predetermined position.

9. The system of claim 8, wherein the predetermined position is a tip of the implement.

10. The system of claim 1, wherein, to determine the center of gravity distance, the controller is configured to:
  determine the center of gravity distance based on the distribution of the payload, within the implement, relative to the pin and based on a tilt angle of the implement.

11. The system of claim 1, wherein, to determine the center of gravity distance, the controller is configured to:
  determine the center of gravity distance based on the distribution of the payload, within the implement, relative to the pin and based on a location of an arm coupled to the implement.

12. The system of claim 1, wherein the implement is rotatably connected to the pin and pivots about an axis defined by the pin.

13. The system of claim 1, wherein, to determine the load value, the controller is configured to:
  determine the load value based on a mass of the implement and based on a mass of the payload.

14. A machine, comprising:
an implement;
a pin that is connected to the implement; and
one or more processors configured to:
  determine a load value associated with the implement;
  determine a center of gravity value based on a distribution of a payload, within the implement, relative to the pin;
  determine a center of gravity location, associated with the implement, based on the center of gravity value; and
  control machine operational parameters based on the load value and the center of gravity location.

15. The machine of claim 14,
wherein the implement is a bucket, and
wherein the implement is rotatably connected to the pin and pivots about an axis defined by the pin.

16. The machine of claim 14, wherein, to determine the center of gravity value, the one or more processors are configured to:
  determine the center of gravity value based on whether the distribution of the payload, within the implement, is closer to the pin than a predetermined position.

17. The machine of claim 16,
wherein the implement is a bucket, and
wherein the predetermined position is a tip of the bucket.

18. A method, comprising:
  determining a load value associated with an implement of a machine;
  determining a center of gravity value associated with the implement based on a distribution of a payload, within the implement, relative to a pin that is connected to the implement;
  determining a center of gravity location, associated with the implement, based on the center of gravity value; and
  controlling machine operational parameters based on the load value and the center of gravity location.

19. The method of claim 18,
wherein the implement is a bucket, and
wherein the implement is rotatably connected to the pin and pivots about an axis defined by the pin.

20. The method of claim 18, wherein determining the center of gravity value comprises:
  determining the center of gravity value based on whether the distribution of the payload, within the implement, is closer to the pin than a predetermined position.

\* \* \* \* \*